United States Patent
Cowan et al.

(10) Patent No.: US 10,132,181 B2
(45) Date of Patent: Nov. 20, 2018

(54) IMPINGEMENT COOLED NOZZLE LINER

(71) Applicant: United Technologies Corporation, Farmington, CT (US)

(72) Inventors: Curtis C. Cowan, E. Hampton, CT (US); Jorge I. Farah, Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/876,602

(22) Filed: Jan. 22, 2018

(65) Prior Publication Data

US 2018/0156053 A1 Jun. 7, 2018

Related U.S. Application Data

(62) Division of application No. 13/173,903, filed on Jun. 30, 2011.

(51) Int. Cl.
*F02K 1/82* (2006.01)
*F01D 11/00* (2006.01)
(Continued)

(52) U.S. Cl.
CPC ............ *F01D 11/005* (2013.01); *F01D 5/18* (2013.01); *F02C 7/28* (2013.01); *F02K 1/006* (2013.01); *F02K 1/12* (2013.01); *F02K 1/1223* (2013.01); *F02K 1/822* (2013.01); *F16J 15/025* (2013.01); *F16J 15/027* (2013.01); *F16J 15/0893* (2013.01); *Y02T 50/675* (2013.01)

(58) Field of Classification Search
CPC .......... F02C 7/28; F02K 1/006; F02K 1/1223; F02K 1/822; F16J 15/025; F16J 15/027; F16J 15/0893

USPC ............ 60/770, 771, 782, 796; 239/265.39, 239/265.41, 265.43; 277/606, 608, 609, 277/644–646
See application file for complete search history.

(56) References Cited

U.S. PATENT DOCUMENTS

| | | | | |
|---|---|---|---|---|
| 4,000,610 A | * | 1/1977 | Nash | F02K 1/006 239/265.27 |
| 4,544,098 A | * | 10/1985 | Warburton | F02K 1/1223 239/127.3 |

(Continued)

FOREIGN PATENT DOCUMENTS

EP 0541346 A1 * 5/1993 ............ F02K 1/1223

OTHER PUBLICATIONS

European Search Report for European Application No. 12173265.5 dated Apr. 7, 2017.

*Primary Examiner* — Gerald L Sung
*Assistant Examiner* — Marc Amar
(74) *Attorney, Agent, or Firm* — Carlson, Gaskey & Olds, P.C.

(57) ABSTRACT

A method for cooling a rotatable nozzle includes rotating a curved seal about a seal land while maintaining contact therewith. Cooling air is directed through a first diffusion hole in the curved seal to cool the nozzle if the rotatable curved seal is in a first position where higher heat is encountered. Cool air is directed through a second diffusion hole in the curved seal to cool the nozzle if the rotatable curved seal is in a first position where higher heat is encountered and if in a second position where relatively lower heat is encountered.

11 Claims, 3 Drawing Sheets

(51) Int. Cl.
  *F02K 1/12*  (2006.01)
  *F02C 7/28*  (2006.01)
  *F16J 15/08*  (2006.01)
  *F02K 1/00*  (2006.01)
  *F16J 15/02*  (2006.01)
  *F01D 5/18*  (2006.01)

(56) References Cited

U.S. PATENT DOCUMENTS

| | | | | |
|---|---|---|---|---|
| 4,690,329 A | * | 9/1987 | Madden | F02K 1/62 239/265.19 |
| 4,753,392 A | * | 6/1988 | Thayer | F02K 1/12 239/265.29 |
| 5,092,525 A | * | 3/1992 | Roach | F02K 1/625 239/265.29 |
| 5,101,624 A | * | 4/1992 | Nash | F02K 1/805 239/127.1 |
| 5,239,815 A | * | 8/1993 | Barcza | F02K 1/1261 239/265.35 |
| 5,255,849 A | * | 10/1993 | Mayer | F02K 1/1223 239/127.3 |
| 5,398,499 A | * | 3/1995 | Urruela | F02K 1/008 239/265.35 |
| 5,437,411 A | * | 8/1995 | Renggli | F02K 1/008 239/265.39 |
| 5,586,431 A | * | 12/1996 | Thonebe | F02K 1/36 239/127.3 |
| 5,680,755 A | * | 10/1997 | Hauer | F02K 1/008 239/265.35 |
| 5,720,434 A | * | 2/1998 | Vdoviak | F02K 1/12 239/127.1 |
| 5,839,663 A | * | 11/1998 | Broadway | F02K 1/1223 239/265.35 |
| 6,195,981 B1 | * | 3/2001 | Hanley | F02K 1/008 60/204 |
| 6,199,371 B1 | | 3/2001 | Brewer et al. | |
| 6,301,877 B1 | * | 10/2001 | Liang | F02K 1/822 239/127.3 |
| 6,966,189 B2 | * | 11/2005 | Lapergue | F02K 1/805 60/771 |
| 7,032,835 B2 | * | 4/2006 | Murphy | F02K 1/1223 239/128 |
| 7,377,099 B2 | * | 5/2008 | Cowan | F02K 1/1223 239/127.3 |
| 7,581,385 B2 | | 9/2009 | Farah et al. | |
| 7,757,477 B2 | * | 7/2010 | Kehret | F02K 1/1223 239/13 |
| 8,205,454 B2 | * | 6/2012 | Cowan | F02K 1/1223 239/265.39 |
| 8,607,574 B1 | * | 12/2013 | Moon | F02K 1/1223 239/265.11 |
| 2004/0003585 A1 | * | 1/2004 | Allore | F02K 1/06 60/266 |
| 2005/0005608 A1 | * | 1/2005 | Pancou | F02K 1/002 60/771 |
| 2005/0161527 A1 | * | 7/2005 | Murphy | F02K 1/1223 239/128 |
| 2005/0235628 A1 | * | 10/2005 | Senile | B64D 33/04 60/266 |
| 2006/0137324 A1 | | 6/2006 | Farah | |
| 2007/0062199 A1 | * | 3/2007 | Cowan | F02K 1/1223 60/770 |
| 2008/0072604 A1 | * | 3/2008 | Swanson | F02K 1/06 60/770 |
| 2009/0072044 A1 | * | 3/2009 | Kehret | F02K 1/1223 239/13 |

* cited by examiner

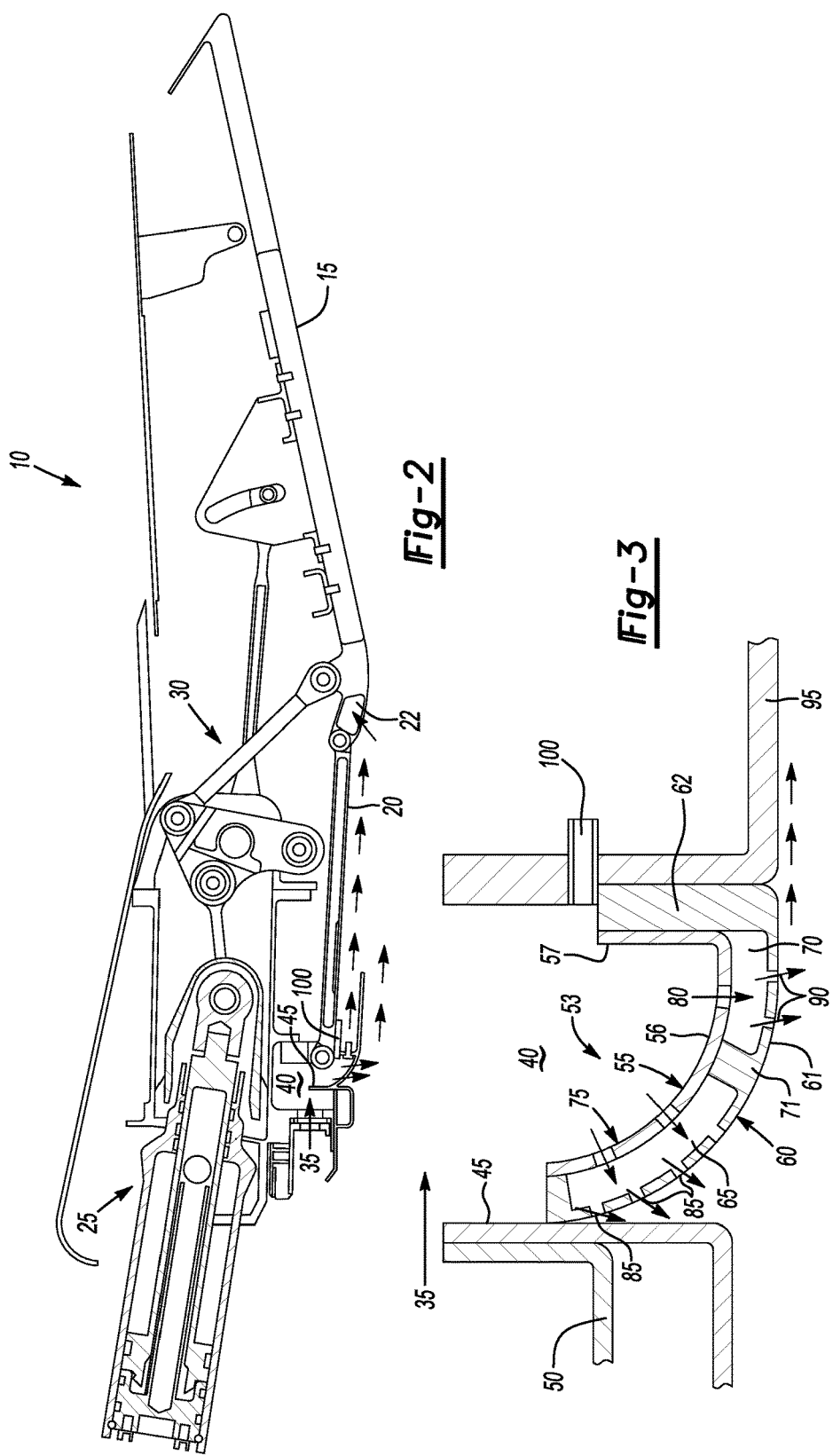

IMPINGEMENT COOLED NOZZLE LINER

CROSS-REFERENCE TO RELATED APPLICATIONS

This disclosure is a divisional of U.S. patent application Ser. No. 13/173,903 filed Jun. 30, 2011.

STATEMENT REGARDING FEDERALLY SPONSORED RESEARCH OR DEVELOPMENT

This invention was made with Government support under Contract No. N00019-02-C-3003 awarded by the Department of the United States Navy. The Government has certain rights in this invention.

BACKGROUND

In gas turbine engines, it is necessary to protect exhaust ducts with an insulating shield in order to prevent heated core gases from damaging the exhaust ducts. Typically, exhaust ducts are made from titanium-based alloys and may have temperature limits of approximately 300° F. or about 148.9° C. Exhaust gases, however, reach much higher temperatures. It is, therefore, necessary to line exhaust ducts with a material that is capable of withstanding the peak temperatures of the core gases and that prevents the exhaust duct from reaching its temperature limitations. Exhaust duct liners are typically made from nickel-based alloys, which have temperature limits of approximately 700° F. or about 371.1° C. In order to alleviate some of the heat from the exhaust gases imparted to the liner, cooling air is passed between the exhaust duct and liner.

SUMMARY

In one exemplary embodiment, a method for cooling a rotatable nozzle includes rotating a curved seal about a seal land while maintaining contact therewith. Cooling air is directed through a first diffusion hole in the curved seal to cool the nozzle if the rotatable curved seal is in a first position where higher heat is encountered. Cool air is directed through a second diffusion hole in the curved seal to cool the nozzle if the rotatable curved seal is in a first position where higher heat is encountered and if in a second position where relatively lower heat is encountered.

In a further embodiment of any of the above, cooling air is directed into a first chamber in the curved seal and cooling air is directed into a second chamber in the curved seal.

In a further embodiment of any of the above, cooling air is directed from the first chamber through the first diffusion hole in the curved seal if the curved seal is in the first position. Cooling air is directed from the second chamber through the second diffusion hole in the curved seal if the curved seal is in the first position and in the second position.

In a further embodiment of any of the above, the curved seal includes an inner liner and an outer liner. The first diffusion hole and the second diffusion hole are located in the outer liner.

In a further embodiment of any of the above, the first diffusion hole and the second diffusion hole are located in a curved portion of the outer liner.

In a further embodiment of any of the above, a separator plate divides the first chamber from the second chamber.

In a further embodiment of any of the above, the inner liner is in register with the outer liner.

In a further embodiment of any of the above, the first diffusion hole is located axially forward of the second diffusion hole relative to a longitudinal axis of the nozzle.

In a further embodiment of any of the above, cooling air is directed into the first chamber through a first set of infusion holes. Cooling air is directed into the second chamber through a second set of infusion holes.

In a further embodiment of any of the above, cooling air is directed from the first chamber through the first diffusion hole in the curved seal if the curved seal is in the first position. Cooling air is directed from the second chamber through the second diffusion hole in the curved seal if the curved seal is in the first position and in the second position.

In a further embodiment of any of the above, first set of infusion holes are located axially forward of the second set of infusion holes relative to a longitudinal axis of said nozzle.

The various features and advantages of the disclosed examples will become apparent to those skilled in the art from the following detailed description. The drawings that accompany the detailed description can be briefly described as follows.

BRIEF DESCRIPTION OF THE DRAWINGS

FIG. 2 is a description of the nozzles as shown in FIG. 2 incorporating an embodiment as shown herein in a second position.

FIG. 3 is a sectional view of a nozzle cooling liner.

DETAILED DESCRIPTION

Figure 1:
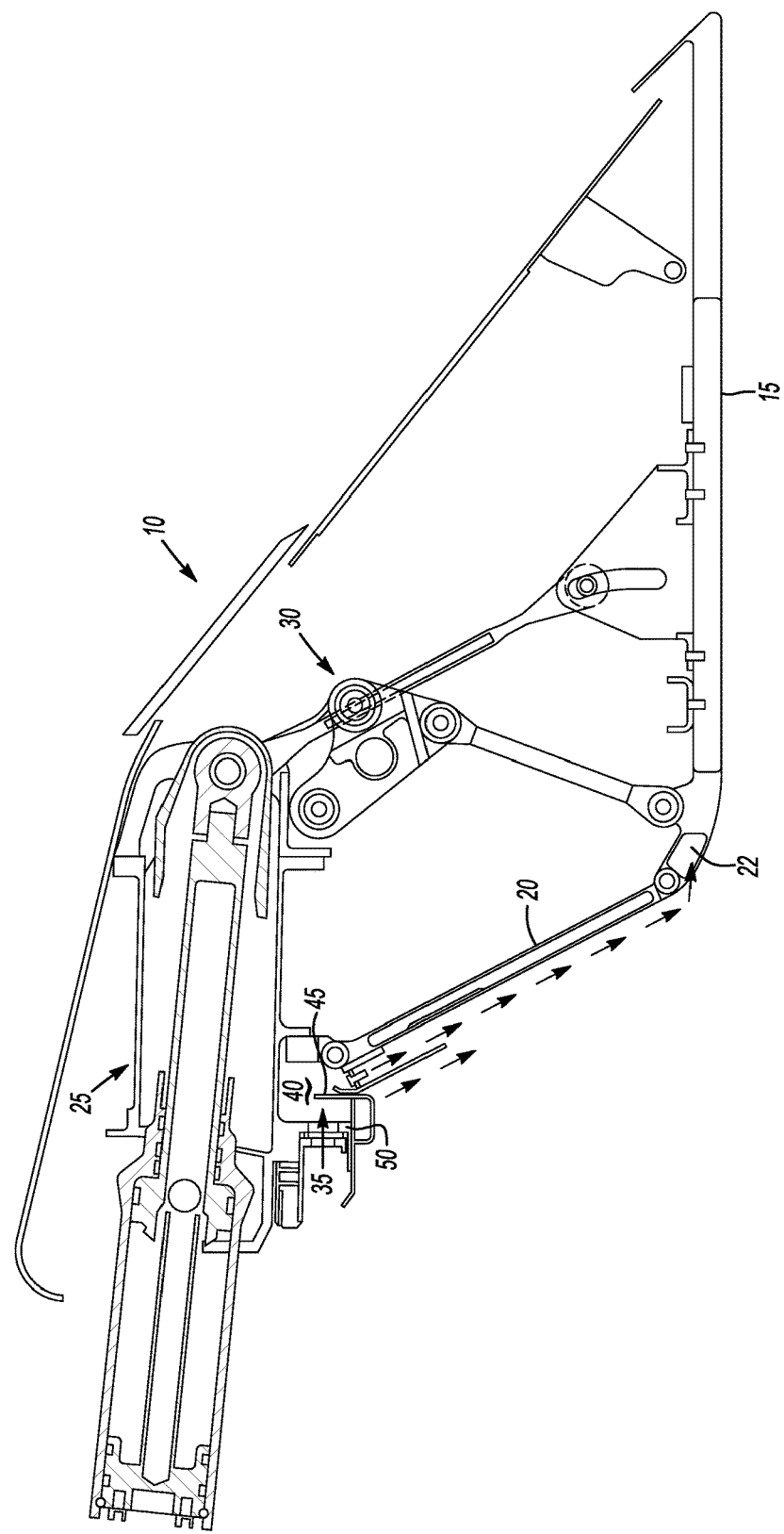
FIG. 1 is a sectional view of a nozzle liner incorporating a cooling system as described herein in a first position.

Referring now to FIGS. 1 and 2, a nozzle 10 is shown. The nozzle 10 has a divergent flap seal 15 that is connected conventionally to convergent flap seal 20. The divergent flap seal 15 has an opening 22 for receiving cooling air as will be discussed infra.

An actuator 25 drives a linkage 30 to move the nozzle 10 between various positions as shown in FIGS. 1 and 2. In FIG. 1, a gas turbine engine (not shown) is producing minimal thrust and the convergent flap seal 20 has moved inwardly pulling the divergent flap seal 15 axially inwardly. In FIG. 2, the actuator 25 through linkage 30 has moved divergent flap seal 15 upwardly and the convergent flap seal 20 upward so that maximum thrust can be obtained. A secondary air source 35, which may be from an engine compressor (not shown), or some other source, is shown. Air from the secondary air source 35 is directed into a plenum 40 that is divided by a seal land 45. The seal land 45, as can be seen more readily in FIG. 3, is attached to a housing 50 through which the secondary air source 35 is directed.

Figure 4:
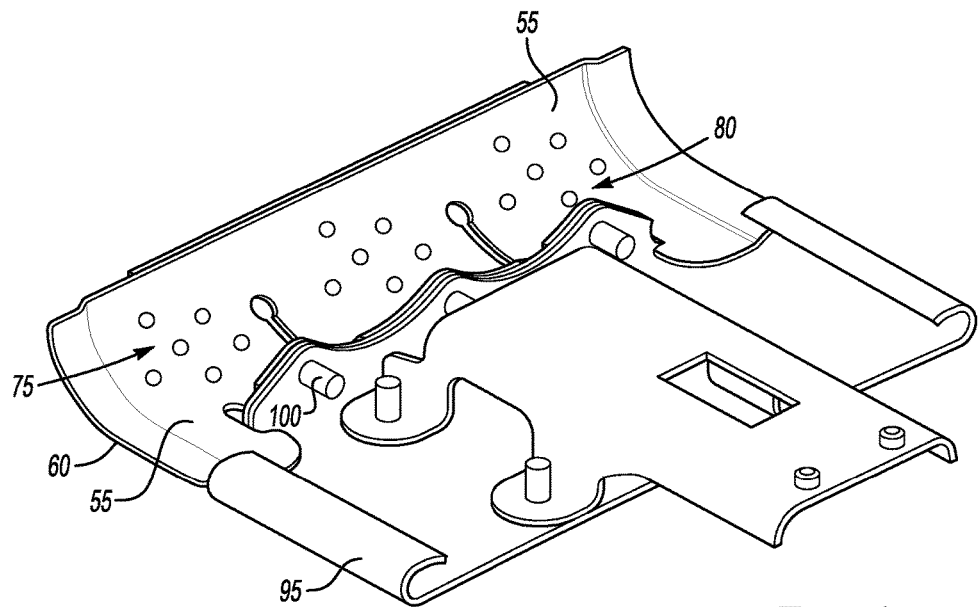
FIG. 4 shows a back view of the nozzle liner of FIG. 3.
Figure 5:
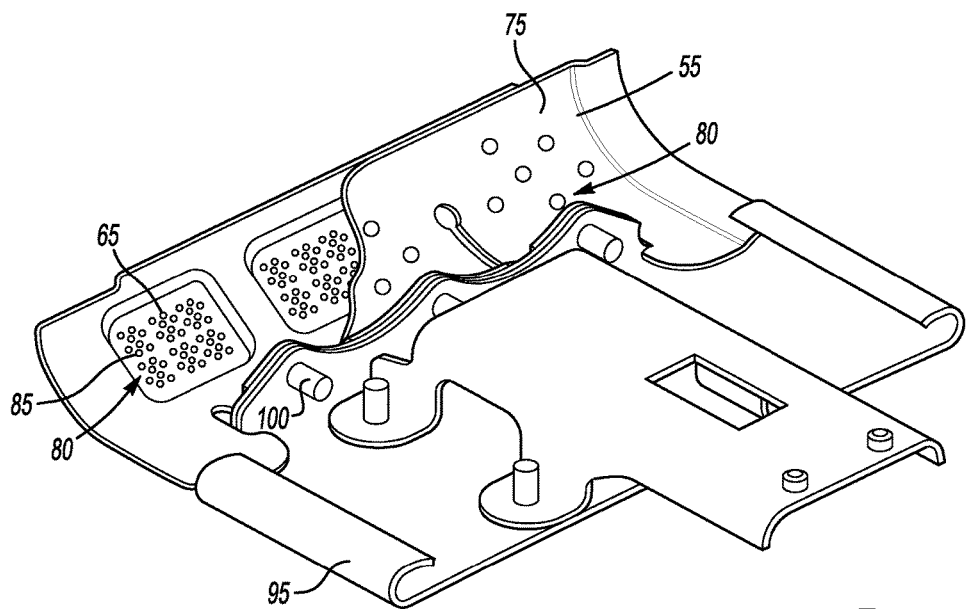
FIG. 5 shows a partially segmented back view of the nozzle liner of FIG. 4.

Referring now to FIGS. 3-5, cooling liner 53, which acts as a seal against the seal land 45, has an inner liner 55, a curved body 56 and an upwardly extending flange 57. The outer liner 60 has a similarly curved body 61 and an upwardly extending flange 62 that attaches fixedly to the upper flange 57 of the inner liner 55. The outer liner curved body is curved so that line contact with the seal land 45 is maintained as the convergent flap seal 20 rotates (see FIGS. 1-3).

A separator plate 71 is disposed between the inner liner 55 and the outer liner 60 to create a first chamber 65 and a second chamber 70. The inner liner 55 has a first set of infusion holes 75 and a second set of infusion holes 80. The first set of infusion holes 75 meters air to the first chamber 65. The second set of infusion holes 80 in the inner liner 55 feed the second chamber 70. The outer liner 60 has a first set of diffusion holes 85 and a second set of diffusion holes 90. The first set of diffusion holes 85 expels air from chamber 65 and the second set of diffusion holes 90 in the outer liner 60 diffuse air from the second chamber 70 from the cooling liner 53.

Air expelled from the first set of diffusion holes 85 of the outer liner 60 and the second set of diffusion holes 90 in the outer liner 60 travel along the convergent liner 95. The plenum 40 also delivers air through a divergent supply nozzle 100 to travel along the convergent flap seal 20 to the opening 22 of the divergent flap seal 15.

Referring now to FIG. 2, if maximum thrust is being provided, for instance, by an engine (not shown) associated with the nozzle 10, the nozzle is in the maximum thrust position as shown. The divergent flap seal 15 diverges from the thrust area as does the convergent flap seal 20. In this position, secondary cooling air 35 passes into plenum 40, through the first set of infusion holes 75 into chamber 65 and through the first set of diffusion holes 85 to provide cooling air to the convergent liner 95, the convergent flap seal 20 and the divergent flap seal 15. Similarly, secondary cooling air 35 also passes into plenum 40, through the second set of infusion holes 80 into chamber 70 and through the second set of diffusion holes 90 also to provide cooling air to the convergent liner 95, the convergent flap seal 20 and the divergent flap seal 15. The outer liner 60 still attaches to the seal land 45 as shown in FIG. 3 and the maximum amount of air is expelled therefrom.

Referring to FIG. 1, maximum thrust is not necessary and the convergent flap seal 20 is moved downwardly into the flow stream. Because the inner liner 55 and the outer liner 60 of the cooling liner 53 is rotated with the movement of the convergent flap seal 20, air moving out of the first chamber 65 through the outer liner first set 85 of diffusion holes is shut off. Line contact between the seal land 45 and the cooling liner is in the vicinity of the separator 71. Secondary cooling air 35 then passes into plenum 40, through the second set of infusion holes 80 into chamber 70 and through the second set of diffusion holes 90 also to provide cooling air to the convergent liner 95, the convergent flap seal 20 and the divergent flap seal 15. Because less thrust is required, less heat is generated and less secondary cooling air is required for the convergent liner 95 and the convergent flap seal 20 and the divergent flap seal 15. Flow through the divergent supply nozzle 100 is not affected by motion of the convergent flap seal 20 to provide secondary cooling air to the divergent flap seal 15 through opening 22.

Rotation of the convergent flap seal 20 rotates the cooling liner 53 to vary line contact with the seal land 45 and open and close portions of or all of the first set of diffusion holes 85 thereby metering cooling air as may be necessary for the convergent liner 95 and the convergent flap seal 20 and the divergent flap seal 15 during differing operation of the engine (not shown).

Traditionally, the inner and outer liners 55, 60 might be made of a scarce columbium alloy (Nb) for its inherent low thermal expansion and its ability to withstand heat. However, columbium alloy has limited strength and is difficult to process. For instance, producing cooling holes in Nb is difficult due to its need to be protected from oxygen exposure. Columbium requires application of protective coatings to survive gas turbine environment, said coatings are expensive and environmentally unfriendly. Additionally any hole or penetration in Nb must be produced prior to coating, hence producing small diameter/tight tolerance features are not feasible. By utilizing the designs disclosed herein, secondary cooling air is distributed throughout the exposed curved body 61 of cooling liner 53. The first and second sets of diffusion holes 85, 90 and the first and second sets of infusion (or metering) holes 75, 80 in the inner liner 55, actively meter secondary air flow to coincide with thermal gradients needed for various positions of the divergent flap seal 15 and the convergent flap seal 20. As a result, less expensive and more available materials can be used to create the inner liner 55 and the outer liner 60 rather than columbium alloy. For example, a 625 nickel alloy steel (AMS 5599) may be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for cooling a rotatable nozzle comprising:
    rotating a curved seal about a seal land while maintaining contact therewith, directing cooling air through a first diffusion hole in said curved seal to cool said nozzle if said rotatable curved seal is in a first position where high heat is encountered; and
    directing cooling air through a second diffusion hole in said curved seal to cool said nozzle if said rotatable curved seal is in said first position where higher heat is encountered and if in a second position where low heat is encountered, wherein directing cooling air through the first diffusion hole is shut off in the second position.

2. The method of claim 1 further comprising:
    directing cooling air into a first chamber in said curved seal and
    directing cooling air into a second chamber in said curved seal.

3. The method of claim 2 further comprising:
    directing cooling air from said first chamber through said first diffusion hole in said curved seal if said curved seal is in said first position and,
    directing cooling air from said second chamber through said second diffusion hole in said curved seal if said curved seal is in said first position and in said second position.

4. The method of claim 3, wherein the curved seal includes an inner liner and an outer liner and said first diffusion hole and said second diffusion hole are located in the outer liner.

5. The method of claim 4, wherein the first diffusion hole and the second diffusion hole are located in a curved portion of the outer liner.

6. The method of claim 4, wherein a separator plate divides said first chamber from said second chamber.

7. The method of claim 4, wherein said inner liner is in register with said outer liner.

8. The method of claim 1, wherein said first diffusion hole is located axially forward of said second diffusion hole relative to a longitudinal axis of said nozzle.

9. The method of claim 2, further comprising:
   directing cooling air into said first chamber through a first set of infusion holes; and
   directing cooling air into said second chamber through a second set of infusion holes.

10. The method of claim 9, further comprising:
    directing cooling air from said first chamber through said first diffusion hole in said curved seal if said curved seal is in said first position and,
    directing cooling air from said second chamber through said second diffusion hole in said curved seal if said curved seal is in said first position and in said second position.

11. The method of claim 9, wherein first set of infusion holes are located axially forward of the second set of infusion holes relative to a longitudinal axis of said nozzle.

* * * * *